Sept. 24, 1968 YUJI TAKADA 3,403,355
PHASE CONTROL CIRCUIT
Filed Jan. 12, 1966 9 Sheets-Sheet 9
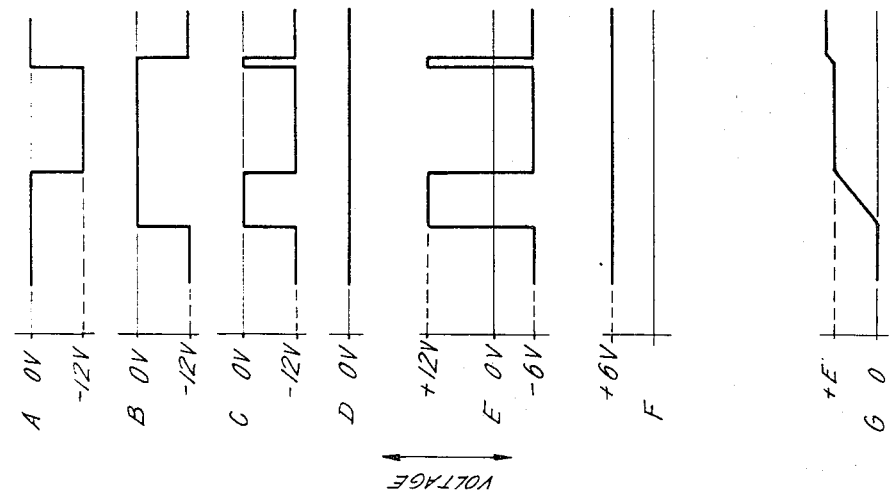
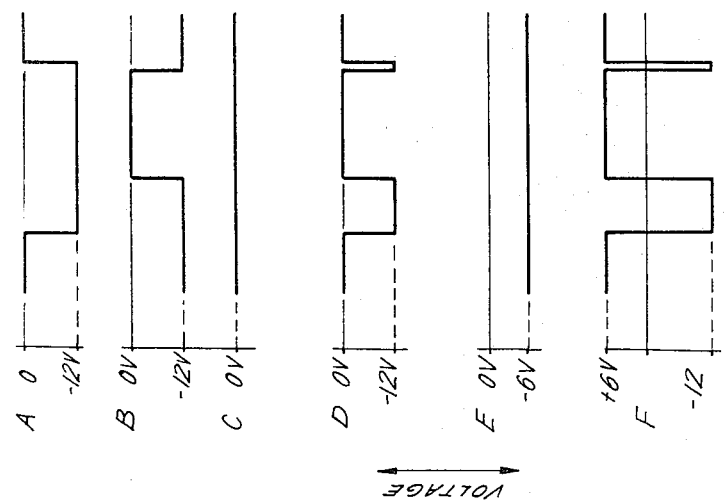

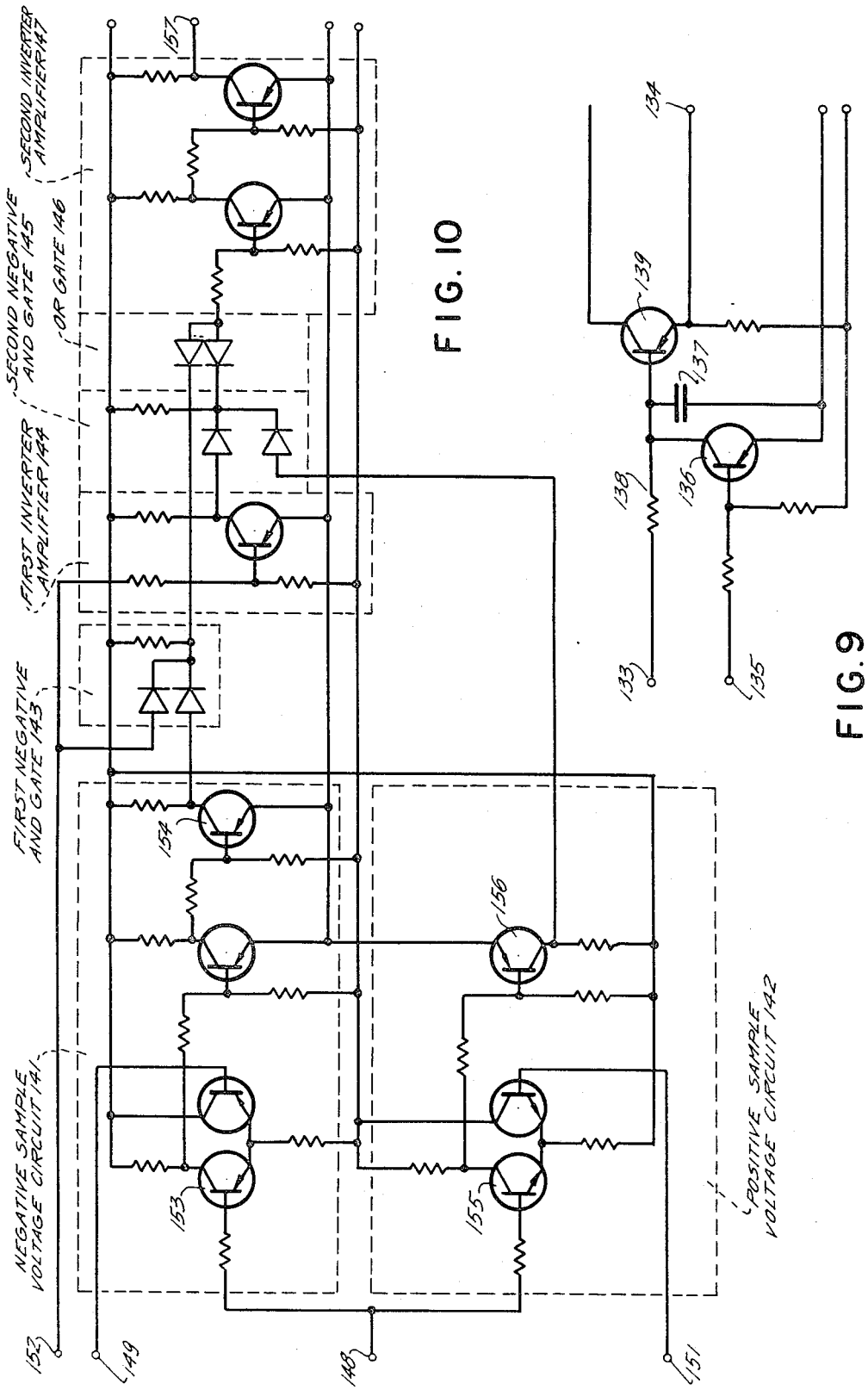

ers 61 and 65 of FIG. 4;
United States Patent Office
3,403,355
Patented Sept. 24, 1968

3,403,355
PHASE CONTROL CIRCUIT
Yuji Takada, Kawasaki-shi, Japan, assignor to Fujitsu
Limited, Kawasaki, Japan, a corporation of Japan
Filed Jan. 12, 1966, Ser. No. 520,285
10 Claims. (Cl. 332—23)

The present invention relates to a phase control circuit. More particularly, the invention relates to an automatic phase control circuit for producing a carrier wave of determined phase.

The principal object of the present invention is to provide a new and improved phase control circuit.

An object of the present invention is to provide a phase control circuit which functions effectively, efficiently and reliably.

In accordance with the present invention, a phase control circuit for controlling the phase of a carrier wave relative to a pair of input signals comprises an input for the input signals and an output for providing from the input signals output signals. A controllable carrier wave generator having an input and an output coupled to the input for the input signals provides a carrier wave for such input signals. A control unit having an input coupled between the input for the input signals and the output for the output signals and an output coupled to the input of the carrier wave generator controls the frequency and phase of the carrier wave generator. The control unit comprises converters for providing a pair of pulses having durations dependent upon the magnitude of voltages derived from the input signals and an adder coupled between the converters and the input of the carrier wave generator for providing a control voltage dependent upon the difference in duration of the pair of pulses provided by the converters to control the frequency and phase of the carrier wave generator. The control unit further comprises gates connected between the converters and the adder for controlling the supply of the pair of pulses provided by the converters to the adder and a multiplier connected between the output for the output signals and the gates for controlling the operation of the gates in accordance with the polarities of the output signals. The carrier wave generator comprises an oscillator and an oscillator frequency control connected to the oscillator and the converters comprise a plurality of converters. The control unit further comprises a reference pulse generator connected to the converters for providing a reference pulse and the voltages derived from the input signals are provided by phase detectors connected to the input for the input signals.

In order that the present invention may be readily carried into effect, it will now be described with reference to the accompanying drawings, wherein:

FIG. 9 is a circuit diagram of an embodiment of a control circuit which may be utilized with the reference pulse generator of FIG. 7;

FIG. 10 is a circuit diagram of an embodiment of one of the converters 61 and 65 of FIG. 4;

FIG. 15 is a series of graphical illustrations explaining the operation of the adder and integrator of FIG. 14; and FIG. 16 is a series of graphical illustrations explaining the operation of the adder and integrator of FIG. 14.

In the figures, the same components are indicated by the same reference numerals.

Figure 1:
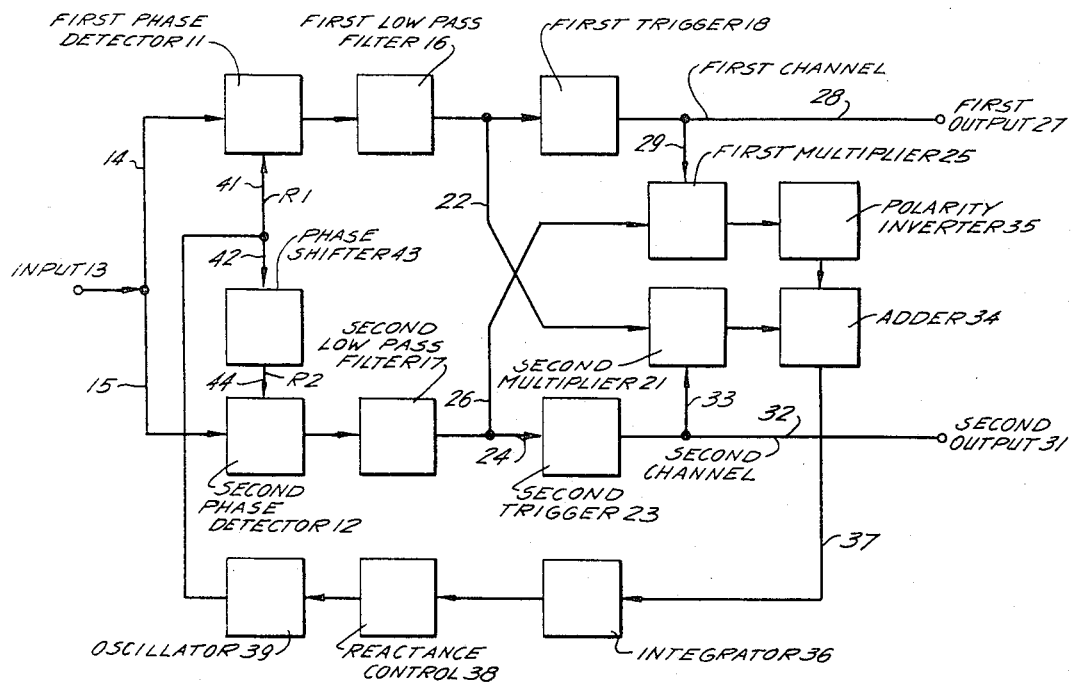
FIG. 1 is a block diagram of a phase control circuit of the prior art.

In the phase control circuit of FIG. 1, an input signal is supplied to the inputs of a first phase detector 11 and a second phase detector 12 via an input terminal 13 and leads 14 and 15, respectively. A first low pass filter 16 has an input connected to the output of the first phase detector 11. A second low pass filter 17 has an input connected to the output of the second phase detector 12. The first signal provided by the first low pass filter 16 is supplied to the input of a first trigger 18 via a lead 19 and to an input of a second multiplier 21 via a lead 22. The second signal provided by the second low pass filter 17 is supplied to the input of a second trigger 23 via a lead 24 and to an input of a first multiplier 25 via a lead 26. The output of the first trigger 18 is connected to a first output terminal 27 via a lead 28 and to another input of the first multiplier 25 via a lead 29. The output of the second trigger 23 is connected to a second output terminal 31 via a lead 32 and to another input of the second multiplier 21 via a lead 33.

The output of the first multiplier 25 is connected to an input of an adder 34 via a polarity inverter 35 and the output of the second multiplier 21 is connected directly to another input of the adder 34. The output of the adder 34 is connected to the input of an integrator 36 via a lead 37. The output of the integrator 36 is connected to a reactance control 38 of an oscillator 39. The output of the oscillator 39 is connected directly to the first phase detector 11 via a lead 41. The output of the oscillator 39 is connected to the second phase detector 12 via a lead 42, a phase shifter 43 and a lead 44.

Figure 2:
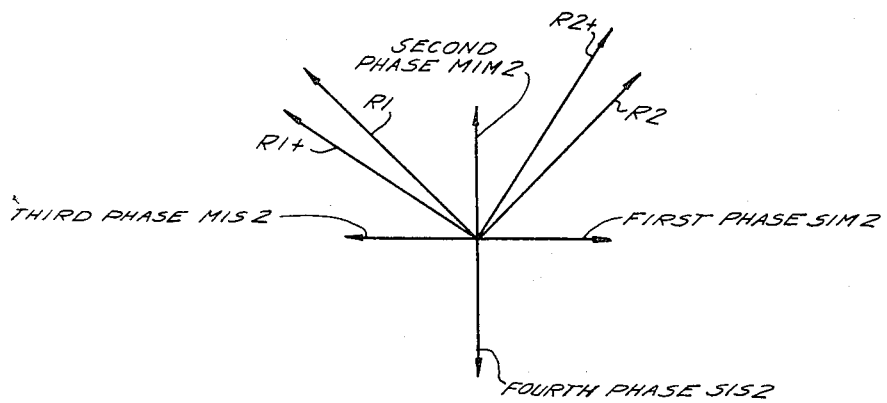
FIG. 2 is a vector diagram of signals in the circuits of FIGS. 1 and 4.
Figure 3:
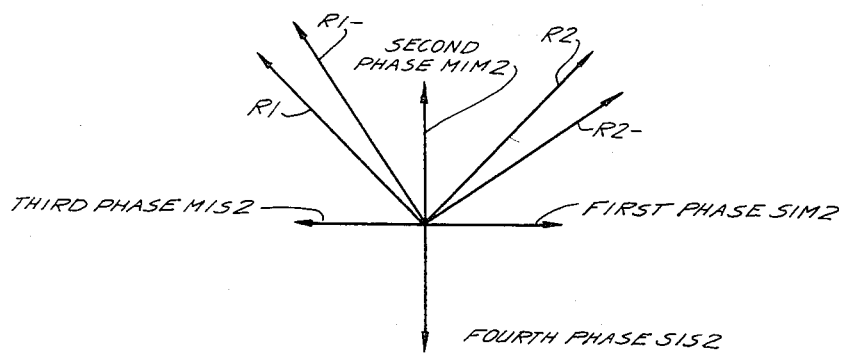
FIG. 3 is a vector diagram of signals in the circuits of FIGS. 1 and 4.

The input signal supplied to the input terminal 13 is modulated to four phases, 90 degrees apart, as shown in FIGS. 2 and 3. In FIGS. 2 and 3, the four phases of input signal are shown as zero or 360 degree, 90 degree, 180 degree and 270 degree vectors SIM2, MIM2, MIS2 and SIS2, respectively. The first, or zero or 360 degree, phase of the four phases of input signal, SIM2, indicates an input signal of Space in the first or number 1 channel and Mark in the second or number 2 channel. The second, or 90 degree, phase of the four phases of input signal, MIM2, indicates an input signal of Mark in the first channel and Mark in the second channel. The third, or 180 degree, phase of the four phases of input signal, MIS2, indicates an input signal of Mark in the first channel and Space in the second channel. The fourth, or 270 degree, phase of the four phases of input signal SIS2, indicates an input signal of Space in the first channel and Space in the second channel.

The oscillator 39 provides the reference signal or carrier wave. The oscillation frequency of the oscillator 39 is equal to the frequency of the input signal. The phases of the reference signals produced by the oscillator 39 in the leads 41 and 44 of the first and second channels, respectively, relative to the input signal, are indicated as vectors R1 and R2, respectively, in FIGS. 2 and 3. The phases of the signals in the first and second channels change at the various components due to the Mark and Space of successive components. In FIGS. 2 and 3, however, the phases of the reference signals are +45°, −45°, +135° or −135°. The first and second phase detectors 11 and 12 produce outputs proportional to cos θ, when the phase difference between the input signal and the reference signal is θ. Thus, the first and second phase detectors produce th same output voltage for a phase difference θ of +45° and −45° as for a phase difference θ of +135° and −135°. If each of the first and second phase detectors 11 and 12 produces an output voltage of, for example, +1 volt for a phase difference of +45° or −45°, it produces an output voltage of −1 volt for a phase difference of +135° or −135°.

The output voltages produced by the first and second phase detectors 11 and 12, respectively, are supplied to the first and second triggers 18 and 23, respectively, via the first and second low pass filters 16 and 17, respectively. The first and second triggers function to make the amplitudes of the outputs of the first and second low pass filters 16 and 17 uniform. The output voltage of the first trigger 18 is supplied to the first channel output terminal 27 and the output voltage of the second trigger 23 is supplied to the second channel output terminal 31. The output voltage of the first trigger 18 is also supplied to the first multiplier 25, which inverts the polarity of the output voltage of the second low pass filter 17 when the output voltage of said first trigger, corresponding to the output voltage of the first low pass filter 16, is negative. The output voltage of the second trigger 23 is also supplied to the second multiplier 21; which inverts the polarity of the output voltage of the first low pass filter 16 when the output voltage of said second trigger, corresponding to the output voltage of the second low pass filter 17, is negative.

The output voltage of the first multiplier 25 is inverted in polarity by the polarity inverter 35 and is algebraically added to the output voltage of the second multiplier 21 in the adder 34. When the reference voltage or reference carrier wave is R1 and R2 (FIGS. 2 and 3), the output voltage of the adder 34 is zero when the input signal is at any of its four phases. There is thus no control signal supplied to the oscillator 39 by the adder 34 and said oscillator continues to produce reference signals R1 and R2.

If the phases of the reference signals R1 and R2 vary to R1+ and R2+ (FIG. 2), the circuit functions to correct such phases back to R1 and R2. Assuming that the output voltage produced by each of the first and second phase detectors 11 and 12 is +1 volt when the phase difference θ between the input signal and the reference signal is ±45°, said output voltage is greater than +1 volt (for example, +1.5 volts) when the phase difference θ is less than ±45°, between zero and +1 volt (for example, +0.5 volt) when the phase difference θ is between ± 45° and ±90°, between zero and −1 volt (for example, −0.5 volt) when the phase difference θ is between ±90° and ±135°, and less than −1 volt (for example, −1.5 volts) when the phase difference θ is between ±135° and ±180°.

Table I indicates the output voltages of the first phase detector 11, the second phase detector 12, the second multiplier 21 and the first multiplier 25 for each of the first, second, third and fourth phases of input signal MIM2, SIM2, SIS2 and MIS2, when the carrier waves are at R1+ and R2+, as shown in FIG. 2.

TABLE I.—OUTPUT VOLTAGE IN VOLTS

| Input signal | First phase detector | Second phase detector | Second multiplier | First multiplier |
|---|---|---|---|---|
| MIM2 | +0.5 | +1.5 | +0.5 | +1.5 |
| SIM2 | −1.5 | +0.5 | −1.5 | −0.5 |
| SIS2 | −0.5 | −1.5 | +0.5 | +1.5 |
| MIS2 | +1.5 | −0.5 | −1.5 | −0.5 |

The output voltage of the first multiplier 25 is inverted in polarity by the polarity inverter 35 and the output voltage of the adder 34 is −1 volt, regardless of the input signal, when the reference signals are R1+ and R2+. The negative voltage provided by the adder 34 functions in known manner, through the integrator 36 and the reactance control 38 of the oscillator 39, to decrease the oscillating frequency of said oscillator thereby to decrease the frequency of the reference signal or carrier wave. When its frequency is decreased, the phase of the reference signal is shifted (in clockwise direction, in FIG. 2) to its proper angle and the reference signals are shifted from R1+ to R1 and from R2+ to R2.

If the phases of the reference signals R1 and R2 vary to R1− and R2− (FIG. 3), the circuit functions to correct such phases back to R1 and R2. Assuming that the output voltage produced by each of the first and second phase detectors 11 and 12 is the same as in the previous instance, Table II indicates the output voltages of the first phase detector 11, the second phase detector 12, the second multiplier 21 and the first multiplier 25 for each of the four phases of input signal, when the carrier waves are at R1− and R2−, as shown in FIG. 3.

TABLE II.—OUTPUT VOLTAGE IN VOLTS

| Input signal | First phase detector | Second phase detector | Second multiplier | First multiplier |
|---|---|---|---|---|
| MIM2 | +1.5 | +0.5 | +1.5 | +0.5 |
| SIM2 | −0.5 | +1.5 | −0.5 | −1.5 |
| SIS2 | −1.5 | −0.5 | +1.5 | +0.5 |
| MIS2 | +0.5 | −1.5 | −0.5 | −1.5 |

The output voltage of the first multiplier 25 is inverted in polarity of the polarity inverter 35 and the output voltage of the addder 34 is +1 volt, regardless of the input signal, when the reference signals are R1+ and R2−. The positive voltage provided by the adder 34 functions in known manner, through the integrator 36 and the reactance control 38 of the oscillator 39, to increase the oscillatory frequency of said oscillator thereby to increase the frequency of the reference signal or carrier wave. When its frequency is increased, the phase of the reference signal to shifted (in counterclockwise direction, in FIG. 3) to its proper angle and the reference signals are shifted from R1− to R1 and from R2− to R2.

In the known phase control circuit of FIG. 1, the algebraic sum of, which is the difference between, the output voltages of the first and second phase detectors 11 and 12 is thus determined and is proportional to the phase difference θ between the reference signal and the input signal. The difference, error or control signal is then utilized to control the phase of the reference signal, via the integrator 36, the reactance control 38 and the oscillator 39, to bring the reference signal back into its desired phase relation with the input signal. The phase control circuit of FIG. 1, however, does not function effectively, efficiently or reliably due to its failure to provide proper voltages and the great difficulty with which a sufficient control voltage is provided. Furthermore, the control voltage is decreased when the magnitude of the input signal is decreased, so that insufficient loop gain and related magnitudes are provided. The deficiencies and inadequacies of the known phase control circuit of FIG. 1 are overcome by the phase control circuit of the present invention.

Figure 4:
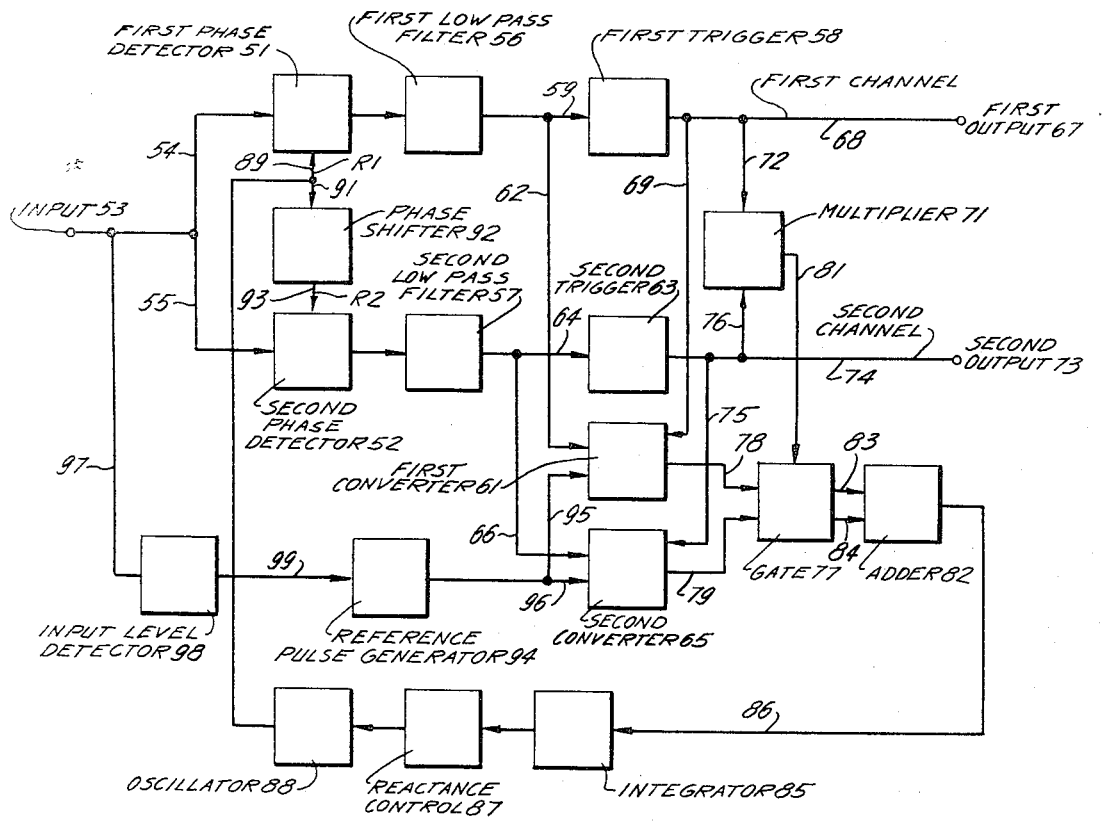
FIG. 4 is a block diagram of an embodiment of a phase control circuit of the present invention.

In FIG. 4, which is an embodiment of the phase control circuit of the present invention, an input signal is supplied to the inputs of a first phase detector 51 and a second phase detector 52 via an input terminal 53 and leads 54 and 55, respectively. A first low pass filter 56 has an input connected to the output of the first phase detector 51. A second low pass filter 57 has an input connected to the output of the second phase detector 52. The first signal provided by the first low pass filter 56 is supplied to the input of a first trigger 58 via a lead 59 and to an input of a first converter 61 via a lead 62. The second signal provided by the second low pass filter 57 is supplied to the input of a second trigger 63 via a lead 64 and to an input of a second converter 65 via a lead 66.

The output of the first trigger 58 is connected to a first output terminal 67 via a lead 68, to another input of the first converter 61 via a lead 69, and to an input of a multiplier 71 via a lead 72. The output of the second trigger 63 is connected to a second output terminal 73 via a lead 74, to another input of the second converter 65 via a lead 75, and to another input of the multiplier 71 via a lead 76. The output of the first converter 61 is supplied as a first signal input to a gate 77 via a lead 78. The output of the second converter 65 is supplied as a second signal input to the gate 77 via a lead 79. The output of the multiplier 71 is supplied as a control signal to the gate 77 via a lead 81.

A first output signal of the gate 77 is supplied to a first input of an adder 82 via a lead 83 and a second output signal of the gate 77 is supplied to a second input of the adder 82 via a lead 84. The output of the adder 82 is supplied to the input of an integrator 85 via a lead 86. The output of the integrator 85 is connected to a reactance control 87 of an oscillator 88. The output of the oscillator 88 is connected directly to the first phase detector 51 via a lead 89. The output of the oscillator 88 is connected to the second phase detector 52 via a lead 91, a phase shifter 92 and a lead 93. A reference pulse generator 94 supplies a reference pulse to the first converter 61 via a lead 95 and to the second converter 65 via a lead 96. The reference pulse generator 94 may be independently operating or may have an input connected to the input terminal 53 via a lead 97, an input level detector 98 and a lead 99.

The input signal supplied to the input terminal 53 is modulated to four phases, 90 degrees apart, as shown in FIGS. 2 and 3, and as supplied to the input terminal 13 of FIG. 1. The oscillator 88 provides the reference signal or carrier wave. The oscillation frequency of the oscillator 88 is equal to the frequency of the input signal. The phases of the reference signals produced by the oscillator 88 in the leads 89 and 93 of the first and second channels, respectively, relative to the input signal, are indicated as vectors R1 and R2, respectively, in FIGS. 2 and 3. The phases of the reference signals R1 and R2 are the same in FIG. 4 as in FIG. 1, and the first and second phase detectors 51 and 52 produce outputs which are the same as those produced by the first and second phase detectors 11 and 12 of FIG. 1. Thus, the first and second phase detectors produce the same output voltage for a phase difference θ between the input signal and the reference signal of +45° and −45° as for a phase difference θ of +135° and −135° and if each of the first and second phase detectors 51 and 52 produces an output voltage of, for example, +1 volt for a phase difference of +45° or −45°, it produces an output voltage of −1 volt for a phase difference of +135° or −135°.

The first and second phase detectors 51 and 52, respectively, the first and second low pass filters 56 and 57, respectively, and the first and second triggers 58 and 63, respectively, function in the same manner as the corresponding components of FIG. 1. When the reference voltage or reference carrier wave is R1 and R2 (FIGS. 2 and 3), normal Mark and Space signals are provided at the first channel first output terminal 67 and at the second channel second output terminal 73.

Each of the first and second converters 61 and 65 samples the output voltage of a corresponding one of the first and second low pass filters 56 and 57 and converts such voltage to a pulse having a width or duration dependent upon the sampled voltage. The duration of the output pulse of each of the first and second converters 61 and 65 corresponds to the output voltage of the corresponding one of the first and second phase detectors 51 and 52, regardless of the polarity of such voltage. The converters sample positive and negative voltages produced by the low pass filters, and function to sample a positive voltage when the output voltage of the corresponding one of the first and second triggers 58 and 63 is positive and to sample a negative voltage when the output voltage of the corresponding one of the first and second triggers 58 and 63 is negative.

Figure 5:
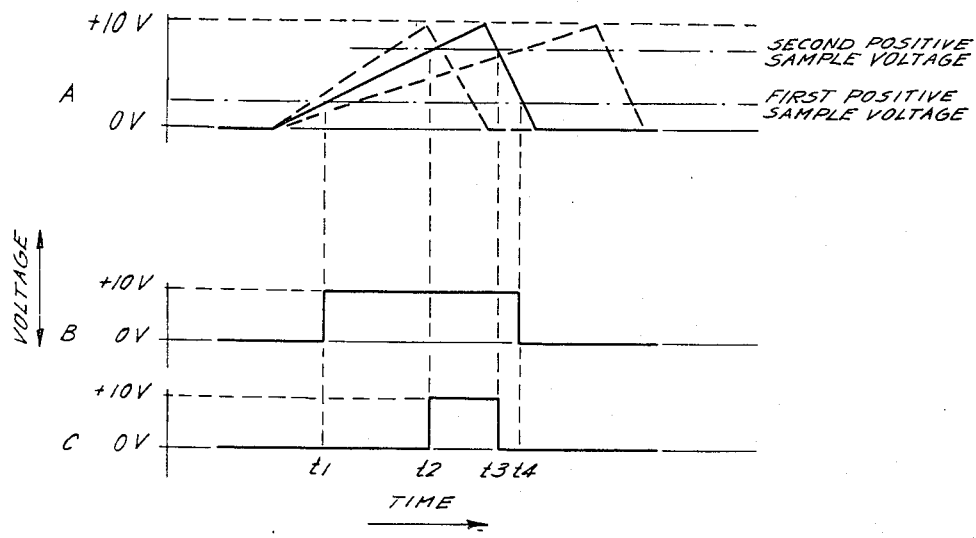
FIG. 5 is a series of graphical illustrations explaining the operation of the converters of FIG. 4.
Figure 6:
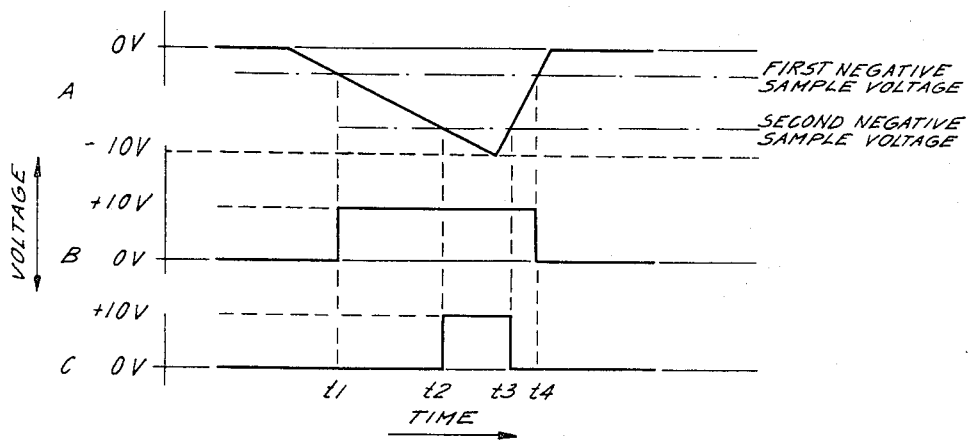
FIG. 6 is a series of graphical illustrations explaining the operation of the converters of FIG. 4.

The operation of each of the first and second converters 61 and 65 is explained with reference to FIGS. 5 and 6. FIG. 5 illustrates the sampling of a positive voltage and FIG. 6 illustrates the sampling of a negative voltage. In each of the curves of each of FIGS. 5 and 6, the ordinate indicates the voltage in volts and the abscissa indicates the time. In curve A of each of FIGS. 5 and 6, the abscissa is indicated as zero volts, the sample voltages are so labelled and the peak voltage is indicated as 10 volts. The first positive sample voltage is a small one, and is equal in magnitude, but opposite in polarity, to the first negative sample voltage. The second positive sample voltage is a large one, and is equal in magnitude, but opposite in polarity, to the second negative sample voltage.

Curve A of FIG. 5 is the triangular wave produced by the reference pulse generator 94, which wave is supplied as a positive wave to the first converter 61 via the lead 95 and is supplied as a positive wave to the second converter 65 via the lead 96. Curve A of FIG. 6 is the triangular wave produced by the reference pulse generator 94, which wave is supplied as a negative wave to the first converter 61 via the lead 95 and is supplied as a negative wave to the second converter 65 via the lead 96.

The first and second positive sample voltages of FIG. 5 intersect the reference curve A at different points due to their different magnitudes, so that the first positive sample voltage produces a converter output pulse B, shown as curve B of FIG. 5, having a duration of t1 to t4. The curve B of FIG. 5 is a positive square wave pulse. The second positive sample voltage produces a converter output pulse C, shown as curve C of FIG. 5, having a duration of t2 to t3. The positive pulse C duration t2 to t3 is considerably less than the duration t1 to t4 of the pulse B in FIG. 5.

The first and second negative sample voltages of FIG. 6 intersect the reference curve A at different points due to their different magnitudes, so that the first negative sample voltage produces a converter output pulse B, shown as curve B of FIG. 6, having a duration of t1 to t4. The curve B of FIG. 6 is a positive square wave pulse. The second negative sample voltage produces a converter output pulse C, shown as curve C of FIG. 6, having a duration of t2 to t3. The positive pulse C duration t2 to t3 is considerably less than the duration t1 to t4 of the pulse B in FIG. 6.

FIGS. 5 and 6 thus illustrate the conversion of sample voltages into pulse durations. The converter output pulse B or C is changed in duration by variation of the slope of the reference pulse A. The leading edge or forward or positive slope of the reference pulse A or the trailing edge or rear or negative slope of said reference pulse may be varied to vary the duration of the converter output pulse. The converter output voltage pulses are supplied as signal inputs to the gate 77 via the leads 78 and 79.

The multiplier 71 functions to multiply the output voltages of the first and second triggers 58 and 63 and produces an output signal which indicates the signal conditions of the first and second channels. Thus, for example, if there is a Mark signal in the first channel and a Mark signal in the second channel, the output signal of the multiplier 71 is positive. The output voltage of the multiplier 71 is supplied as a gate control signal to the gate 77 via the lead 81. When there is a Space signal in the first channel and a Space signal in the second channel, the output signal of the multiplier 71 is positive. However, when the signal in one of the first and second channels is Mark and the signal in the other of the first and second channels is Space, the output signal of the multiplier 71 is negative. Thus, a Mark or Space signal in both the first and second channels produces a positive multiplier 71 output voltage and a Mark signal in one and a Space signal in the other of the first and second channels produces a negative multiplier 71 output voltage.

The output voltage produced by the multiplier 71 functions to control the gating operation of the gate 77 by switching a first part of said gate to its conductive condition to conduct the output voltage of the first converter 61 to the adder 82 via the first output lead 83 of said gate when the output voltage of said multiplier is positive. The output voltage of the multiplier 71 also functions to control the gating operation of the gate 77 by switching a second part of said gate to its conductive condition to conduct the output voltage of the second converter 65 to the adder 82 via the second output lead 84 of said gate when the output voltage of said multiplier is negative.

The adder 82 functions to algebraically add the signals supplied to it via the leads 83 and 84 to provide the difference between the first and second input signals supplied thereto from the gate 77. Thus, the adder 82 provides a positive output voltage in the lead 86 when the first input pulse in the lead 83 is greater than the second input pulse in the lead 84. The adder 82 provides a negative output voltage in the lead 86 when the first input pulse in the lead 83 is less than the second input pulse in the lead 84. The output voltage of the adder 82 is proportional to the difference of the durations of the first and second input pulses to said adder.

The control voltage provided by the adder 82 in the lead 86 functions in known manner, through the integrator 85 and the reactance control 87 of the oscillator 88, to vary the oscillating frequency of said oscillator thereby to vary the frequency of the reference signal or carrier wave so that the phase of said carrier wave is varied accordingly. When the reference voltage or reference carrier wave is R1 and R2 (FIGS. 2 and 3), the output voltage of the adder 82 is zero when the input signal is at any of its four phases. This is due to the difference between the first and second input pulses to the adder 82 being zero, so that the control signal produced by said adder is zero and the oscillator 88 continues to produce reference signals R1 and R2.

Table III indicates the output voltages of the first phase detector 51 and the second phase detector 52, and the duration of the output voltage pulse of the first converter 61 and the duration of the output voltage pulse of the second converter 65 for each of the first, second, third and fourth phases of input signal MIM2, SIM2, SIS2 and MIS2 when the carrier waves R1 and R2 are at ±45° and ±135°, as shown in FIGS. 2 and 3.

TABLE III

| Input signal | Output voltage in volts | | Duration in microseconds | |
|---|---|---|---|---|
| | First phase detector | Second phase detector | First converter output pulse | Second converter output pulse |
| MIM2 | +1 | +1 | 100 | 100 |
| SIM2 | −1 | +1 | 100 | 100 |
| SIS2 | −1 | −1 | 100 | 100 |
| MIS2 | +1 | −1 | 100 | 100 |

If the phases of the reference carrier waves R1 and R2 vary to R1+ and R2+ (FIG. 2), the circuit of FIG. 4 functions to correct such phases back to R1 and R2. Assuming that the output voltage produced by each of the first and second phase detectors 51 and 52 is +1 volt when the phase difference $\theta$ between the input signal and the carrier wave is ±45°, said output voltage is, as in FIG. 1, greater than +1 volt (for example, +1.5 volts) when the phase difference $\theta$ is less than ±45°, between zero and +1 volt (for example, +0.5 volt) when the phase difference $\theta$ is between ±45° and ±90°, between zero and −1 volt (for example, −0.5 volt) when the phase difference $\theta$ is between ±90° and ±135°, and less than −1 volt (for example, −1.5 volts) when the phase difference $\theta$ is between ±135° and ±180°.

Table IV indicates the output voltages of the first phase detector 51 and the second phase detector 52, and the duration of the output voltage pulse of the first converter 61 and the duration of the output voltage pulse of the second converter 65 for each of the first, second, third and fourth phases of input signals MIM2, SIM2, SIS2 and MIS2, when the carrier waves are at R1+ and R2+, as shown in FIG. 2.

TABLE IV

| Input signal | Output voltage in volts | | Duration in microseconds | |
|---|---|---|---|---|
| | First phase detector | Second phase detector | First converter output pulse | Second converter output pulse |
| MIM2 | +0.5 | +1.5 | 50 | 150 |
| SIM2 | −1.5 | +0.5 | 150 | 50 |
| SIS2 | −0.5 | −1.5 | 50 | 150 |
| MIS2 | +1.5 | −0.5 | 150 | 50 |

The difference between the pulse duration of the second signal voltage in the second input lead 84 to the adder 82, which is the subtrahend, and the pulse duration of the first signal voltage in the first input lead 83 to said adder, which is the minuend, is −100 microseconds. A control voltage proportional to −100 microseconds is produced by the adder 82 and functions in known manner, through the integrator 85 and the reactance control 87 of the oscillator 88, to decrease the oscillating frequency of said oscillator thereby to decrease the frequency of the carrier wave. When its frequency is decreased, the phase of the carrier wave is shifted (in clockwise direction, in FIG. 2) to its proper angle and the carrier waves are shifted from R1+ to R1 and from R2+ to R2.

If the phases of the reference signals R1 and R2 vary to R1− and R2− (FIG. 3), the circuit functions to correct such phases back to R1 and R2. Assuming that the output voltage produced by each of the first and second phase detectors 51 and 52 is the same as in the previous instance, Table V indicates the output voltages of the first phase detector 51 and the second phase detector 52, and the duration of the output voltage pulse of the first converter 61 and the duration of the output voltage pulse of the second converter 65 for each of the four phases of input signal, when the carrier waves are at R1− and R2−, as shown in FIG. 3.

TABLE V

| Input signal | Output voltage in volts | | Duration in microseconds | |
|---|---|---|---|---|
| | First phase detector | Second phase detector | First converter output pulse | Second converter output pulse |
| MIM2 | +1.5 | +0.5 | 150 | 50 |
| SIM2 | −0.5 | +1.5 | 50 | 150 |
| SIS2 | −1.5 | −0.5 | 150 | 50 |
| MIS2 | +0.5 | −1.5 | 50 | 150 |

The difference between the pulse duration of the second signal voltage in the second input lead 84 to the adder 82, which is the subtrahend, and the pulse duration of the first signal voltage in the first input lead 83 to said adder, which is the minuend, is +100 microseconds. A control voltage proportional to +100 microseconds is produced by the adder 82 and functions in known manner, through the integrator 85 and the reactance control 87 of the oscillator 88, to increase the oscillating frequency of said oscillator thereby to increase the frequency of the carrier wave. When its frequency is increased, the phase of the carrier wave is shifted (in counterclockwise direction, in FIG. 3) to its proper angle and the carrier waves are shifted from R1− to R1 and from R2− to R2.

The gate 77 thus operates with facility and efficiency due to the converters 61 and 65, which convert the output voltages of the low pass filters 56 and 57 into corresponding pulse durations. The conversion of the voltages to pulse durations in the converters 61 and 65 and the conversion of the difference in pulse durations to a control voltage in the adder 82, enables a large variation in pulse duration to be provided by a small variation in voltage when the reference curve A (FIGS.

5 and 6) produced by the reference pulse generator 94 is of triangular shape and has a gentle slope. This enables a large gain to be provided with facility. Thus, sufficiently large gain is provided for favorable automatic phase control operation.

In the prior art circuit of FIG. 1, when the magnitude or level of the input signal at the input terminal 13 varies, the output voltages of the phase detectors 11 and 12 and of the adder 34 also vary. It is assumed that each low pass filter 16 and 17 provides an output voltage of $A \cos \theta$, where $\theta$ is the phase difference between the carrier wave and the input signal and $A$ is a coefficient proportional to the magnitude of the input signal. If the phase of the carrier wave shifts $+10°$ from R1 to R1+ (FIG. 2), the output voltages of the low pass filters 16 and 17, respectively, when the input signal is M1M2, are $$A \cos (45°+10°) = A \cos 55° = (A)(0.5735)$$
$$A \cos (45°-10°) = A \cos 35° = (A)(0.8192)$$

The output voltage of the adder 34 is then the difference between the output voltage of the first low pass filter 16 and the output voltage of the second low pass filter 17, which is $0.5735A - 0.8192A = -0.2457A$. In the circuit of FIG. 1, the output voltage of the adder 34 decreases when the magnitude of the input signal decreases. When the output voltage of the adder 34 decreases, there is insufficient control voltage of the oscillator 39 and the operation of the automatic phase control circuit of FIG. 1 is likely to become unstable.

The problem due to voltage decrease is solved by the phase control circuit of the present invention, as shown in FIG. 4. The input level detector 98 detects the level or magnitude of the input signal and varies the slope of the reference pulse A (FIGS. 5 and 6) produced by the reference pulse generator 87 in accordance with the detected magnitude. Thus, for example, if the magnitude or level of the input signal decreases, the slope of the reference pulse A is decreased or gentled, as shown by broken lines in curve A of FIG. 5, and if the magnitude or level of the input signal increases, the slope of the reference pulse A is increased or steepened, as shown by broken lines in curve A of FIG. 5. This enables the magnitude or level of the input signal to vary the duration of the output voltage pulses of the first and second converters 61 and 65, but the output voltage of the adder 82 is unaffected by variation of the magnitude or level of the input signal. The output voltage of the adder 82 is proportional to the shift of phase of the reference signal or carrier wave and is not affected by the magnitude or level of the input signal.

The reference pulse A (FIGS. 5 and 6) may be a non-triangular pulse, different from that shown in FIGS. 5 and 6. It is assumed that the reference pulse waveshape rises gradually when the voltage is low and rises rapidly when the voltage is high. The reference pulse waveshape may thus have a slope which increases rectilinearly; the second derivative of said slope being a constant. If the output voltage of the first low pass filter 56 is 0.5735A and the output voltage of the second low pass filter 57 is 0.8192A, the output voltage of the adder 82, if the triangular reference pulse of FIG. 5 is utilized, is $$0.5735A - 0.8192A = -0.2457A$$

If the rectilinearly increasing slope waveform reference pulse is utilized, the output voltage of the first low pass filter 56 after conversion is $\sqrt{0.5735A}$ and the output voltage of the second low pass filter 57 after conversion is $\sqrt{0.8192A}$, and the output voltage of the adder 82 is proportional to $\sqrt{0.5735A} - \sqrt{0.8192A} = -0.147\sqrt{A}$. Thus, for example, if the magnitude or level of the output voltage of the low pass filters is decreased to half, the output voltage of the adder 82 is decreased to half, if the triangular reference pulse of FIG. 5 is utilized. If the rectilinearly increasing slope waveform reference pulse is utilized, however, if the magnitude of the output voltage of the low pass filters is decreased to half, the output voltage of the adder 82 is decreased to $1/\sqrt{2}$, so that the effect of the variation in magnitude is decreased.

The second derivative of the rectilinearly increasing slope of the waveform is a constant, but at the third and fourth derivatives of such waveform, the effect of the variation in magnitude is even further decreased. The various waveshapes may be readily determined by integrating the curves A of FIGS. 5 and 6.

Figure 7:
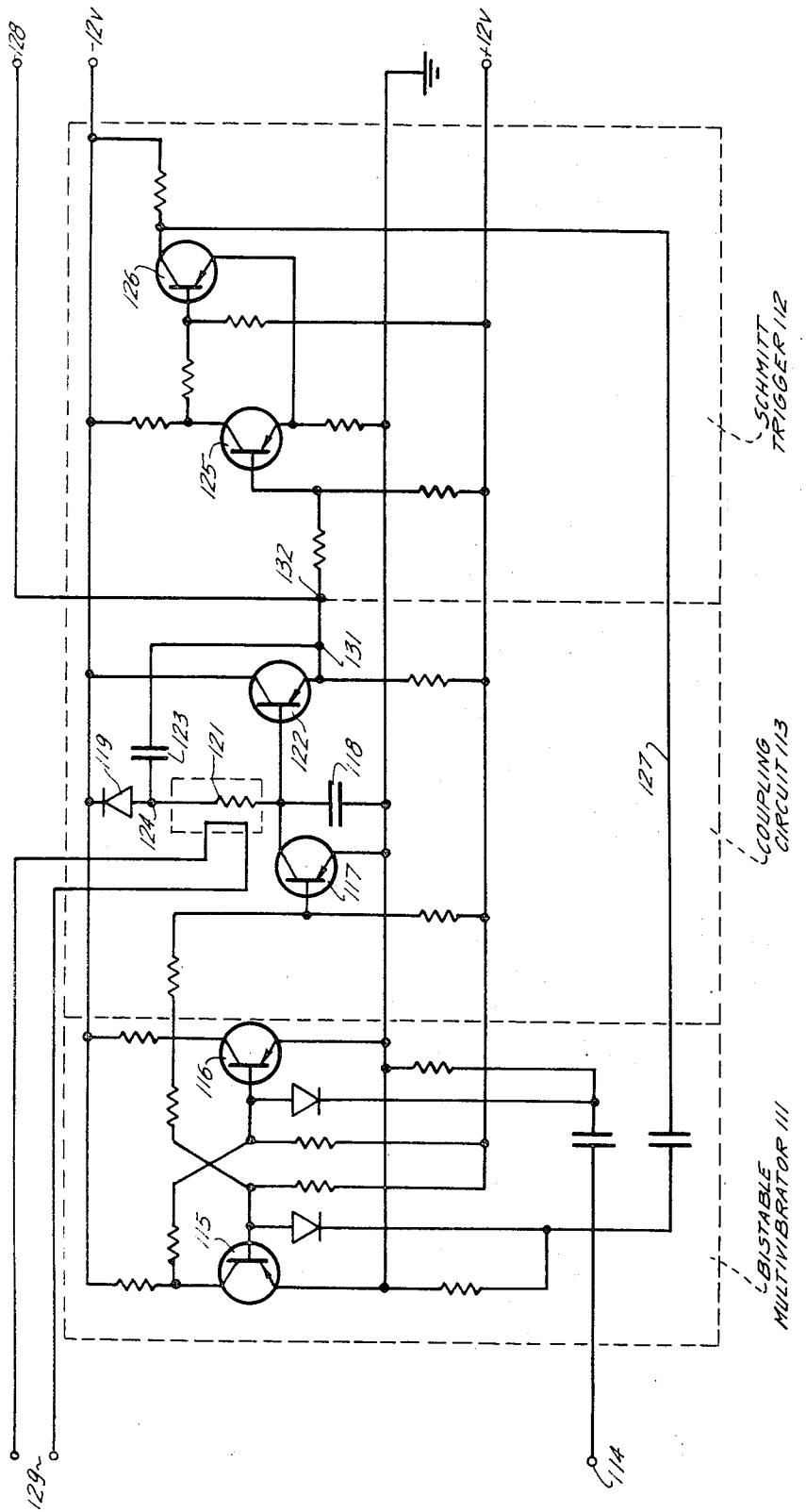
FIG. 7 is a circuit diagram of an embodiment of the reference pulse generator 94 of FIG. 4.
Figure 8:
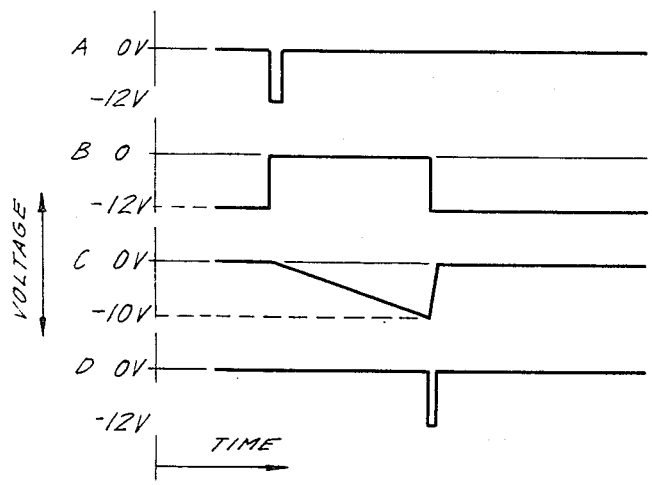
FIG. 8 is a series of graphical illustrations explaining the operation of the reference pulse generator of FIG. 7.

FIG. 7 illustrates a circuit which may be utilized as the reference pulse generator 94 of the phase control circuit of FIG. 4. The reference pulse generator comprises a bistable multivibrator or flip-flop 111, a Schmitt trigger circuit 112 and a coupling circuit 113 coupling the flip-flop 111 to the Schmitt trigger 112. A negative trigger pulse A, shown as curve A in FIG. 8, is applied to an input terminal 114 and switches the bistable multivibrator 111 to its condition in which transistor 115 is nonconductive and transistor 116 is conductive and has a collector voltage of zero volts.

Transistor 117 of the coupling circuit 113, which has a normal input voltage of $-12$ volts, is normally conductive, but is switched to its nonconductive condition when the bistable multivibrator 111 changes its condition. A capacitor 118 of the coupling circuit 113 is short-circuited by the transistor 117 when said transistor is conductive, but when said transistor is nonconductive, said capacitor is charged negatively from the $-12$ volts power source via a diode 119 and a resistor 121. A transistor 122 of the coupling circuit 113 functions as a buffer amplifier and provides at its emitter electrode a voltage almost equal to the input voltage.

When the capacitor 118 begins to be charged, the emitter voltage of the transistor 122 gradually becomes negative. A capacitor 123 has a capacitance which is large enough compared to that of the capacitor 118 so that said capacitor 123 is charged normally from the $-12$ volt power source. Then, when the transistor 117 is switched to its nonconductive condition, and the charging of the capacitor 118 commences, the electrical potential at point 124 of the coupling circuit 113 becomes more negative than the voltage of the power source and the diode 119 is switched to its nonconductive condition. The collector voltage of the transistor 116 is shown as curve B of FIG. 8.

After the diode 119 becomes nonconductive, the capacitor 118 is charged by the capacitor 123 at a time constant determined by the resistor 121 and said capacitor 118. The output voltage of the transistor 122, at its emitter, as shown by curve C of FIG. 8, then becomes negative. The emitter voltage of the transistor 122 is then applied to the Schmitt trigger 112. The trigger voltage of the Schmitt trigger 112 is selected as $-10$ volts, so that when the output voltage of the coupling circuit 113 exceeds $-10$ volts, the Schmitt trigger is switched to its condition in which transistor 125 is nonconductive and transistor 126 is conductive. The output voltage of the transistor 126 of the Schmitt trigger 112, shown as curve D of FIG. 8, is applied to the bistable multivibrator 111 via a feedback path 127, so that when the coupling circuit 113 output voltage exceeds $-10$ volts, the Schmitt trigger 112 is switched in its condition and applies a trigger voltage to the bistable multivibrator 111 to switch said multivibrator in its condition. The transistor 115 is thus switched to its conductive condition and the transistor 116 is switched to its nonconductive condition. The transistor 117 is thus switched to its conductive condition and short-circuits the capacitor 118 so that said capacitor discharges, and the output voltage at output terminal 128 is zero. The circuit of FIG. 7 thus returns to its initial condition.

The resistor 121 of the coupling circuit 113 is replaced by a thermistor when circuit operation is to depend upon the input level of the input signals supplied to the input terminal 53 of FIG. 4. The resistance value of the thermistor 121 then varies in accordance with the input level. The input signal is amplified and rectified and applied to input terminal 129. When the input level increases, the signal applied to the input terminal 129 increases and the resistance value of the thermistor 121 decreases. The decrease in the resistance value of the thermistor 121 decreases the time constant of the coupling circuit 113 and the slope of the output waveshape produced by the reference pulse generator is steepened. When the input level decreases, the signal applied to the input terminal 129 decreases and the resistance value of the thermistor 121 increases. The increase in the resistance value of the thermistor 121 increases the time constant of the coupling circuit 113 and the slope of the output waveshape produced by the reference pulse generator is flattened. This enables a decrease in variation of the loop gain of the phase control circuit as opposed to variation in input level.

Another circuit which may be utilized when circuit operation is to depend upon the input level of the input signals supplied to the input terminal 53 of FIG. 4, is that of FIG. 9. The control circuit of FIG. 9 is connected between points 131 and 132 of the coupling circuit 113 of FIG. 7 via suitable coupling means. In FIG. 9, an input terminal 133 is connected to the point 131 of FIG. 7 and an output terminal 134 is connected to the point 132 of FIG. 7. An input terminal 135 is connected to the collector electrode of the transistor 116 of the bistable multivibrator 111 of FIG. 7. A transistor 136 of the control circuit of FIG. 9 functions in the same manner as the transistor 117 of the coupling circuit 113 of FIG. 7. The transistor 136 is normally conductive, and when conductive short-circuits a capacitor 137. The transistor 136 is switched to its nonconductive condition when the coupling circuit 113 of FIG. 7 is in operation. A resistor 138 and the capacitor 137 function as an integrator to integrate the output of the coupling circuit 113 of FIG. 7. A transistor 139 functions as a buffer amplifier.

Although the reference pulse generator circuit of FIG. 7 is described with reference to negative voltages, it may function equally well on positive voltages, when the PNP type transistors are changed to NPN type transistors and the appropriate polarity and biasing changes are made in the circuit.

FIG. 10 shows a converter which may be utilized as the first converter 61 or the second converter 65 of the phase control circuit of FIG. 4. The converter of FIG. 10 comprises a negative sample voltage circuit 141, a positive sample voltage circuit 142, a first negative AND gate 143, a first inverter amplifier 144, a second negative AND gate 145, a negative OR gate 146 and a second inverter amplifier 147. The output of the first low pass filter 56 is applied via the lead 62 and input terminal 148 or the output of the second low pass filter 57 is applied via the lead 66 to said input terminal. A negative output waveform or reference curve from the reference pulse generator 94 is applied to an input terminal 149 via the lead 95 or 96 and a positive output waveform or reference curve from said reference pulse generator is applied to an input terminal 151 via said lead 95 or 96. The output of the first trigger 58 is applied to an input terminal 152 via the lead 69 or the output of the second trigger 63 is applied to said input terminal via the lead 76.

Figure 11:
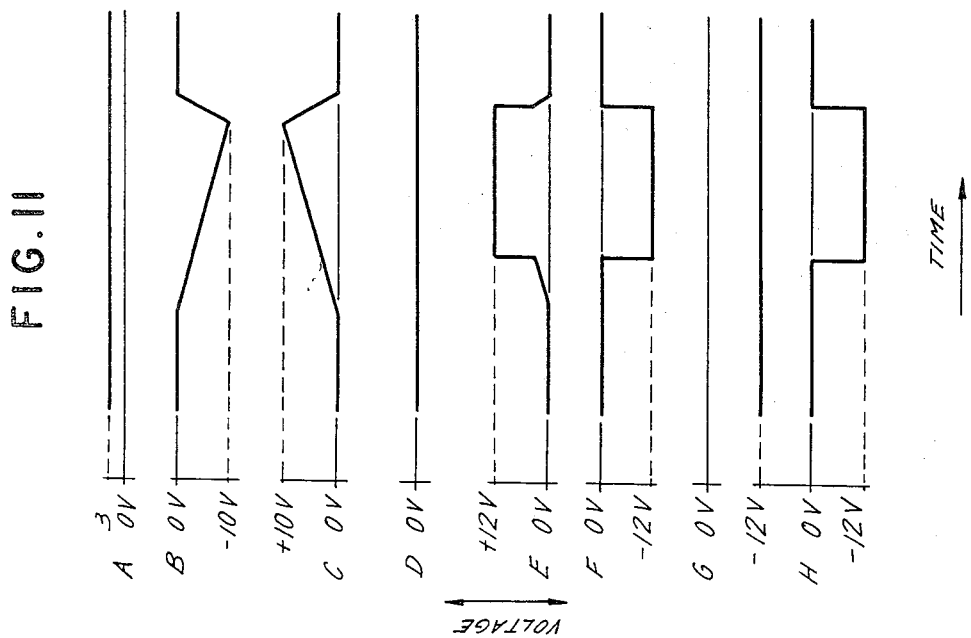
FIG. 11 is a series of graphical illustrations explaining the operation of the converter of FIG. 10.

When the low pass filter output voltage applied to the input terminal 148 is positive such as, for example +3 volts, as shown in curve A of FIG. 11, transistors 153 and 154 of the negative sample circuit 141 are switched to their nonconductive condition and an output voltage of —12 volts is produced at the collector electrode of the transistor 154. Transistors 155 and 156 of the positive sample circuit 142 are switched to their conductive condition and remain conductive when the output reference curve from the reference pulse generator 94 applied to the input terminal 151 is less than +3 volts and said transistors are switched to their nonconductive condition and remain nonconductive when said output reference curve is greater than +3 volts. The output voltage at the collector electrode of the transistor 156 is shown as curve F of FIG. 11. The collector electrode voltage of the collector electrode of the transistor 155 is shown as curve E of FIG. 11. The output voltage at an output terminal 157 is shown as curve H of FIG. 11. The collector electrode voltage of the collector electrode of the transistor 153 is shown as curve G of FIG. 11. The negative reference curve applied to the input terminal 149 is shown as curve B of FIG. 11 and FIG. 12. The positive reference curve applied to the input terminal 151 is shown as curve C of FIG. 11 and FIG. 12. The trigger output voltage applied to the input terminal 152 is shown as curve D of FIG. 11.

As hereinbefore discussed with reference to FIGS. 5 and 6, the output of the positive sample circuit 142 is, as shown in curve F of FIG. 11, a square wave having leading and trailing edges or a duration time defined by such edges which depends upon the magnitude of the low pass filter output voltage shown in curve A of FIG. 11 and applied to the input terminal 148, so that when said low pass filter output voltage is relatively small in magnitude the pulse duration is relatively long and when said low pass filter output voltage is relatively large in magnitude the pulse duration is relatively short.

When the low pass filter output voltage is positive, the output voltage of the trigger is zero volts so that zero volts are applied to the input terminal 152. The first AND gate 143 is then nonconductive and blocks the output of the negative sample circuit 141 from the output stages of the circuit. The second AND gate 145 is conductive at that time, however, and transfers the output of the positive sample circuit 142 to the output terminal 157 via the OR gate 146 and the second inverter amplifier 147.

Figure 12:
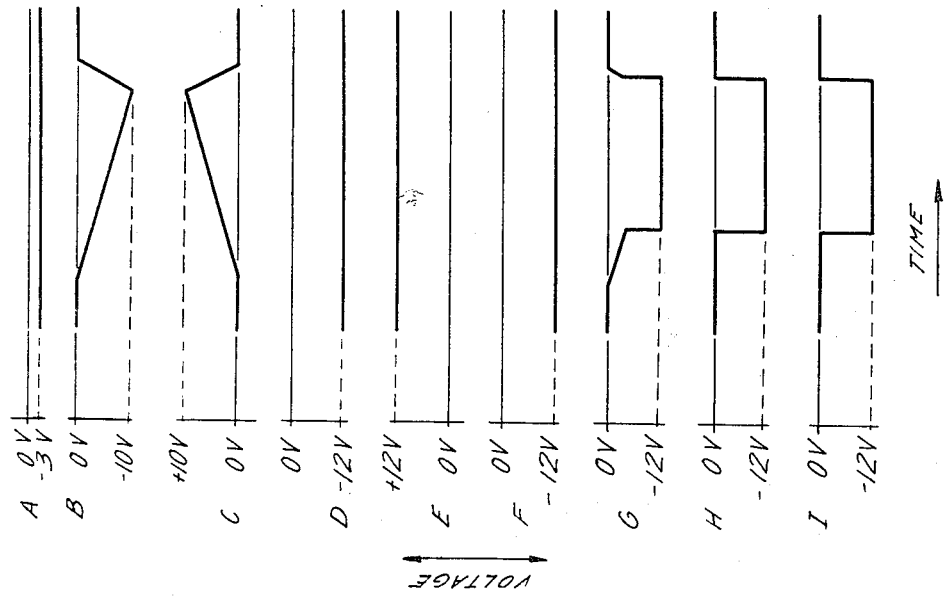
FIG. 12 is a series of graphical illustrations explaining the operation of the converter of FIG. 10.

When the low pass filter output voltage applied to the input terminal 148 is negative such as, for example, —3 volts, as shown in curve A of FIG. 12, the transistors 155 and 156 of the positive sample circuit 142 are switched to their nonconductive condition and an output voltage of —12 volts is produced at the collector electrode of the transistor 156. The transistors 153 and 154 of the negative sample circuit are switched to their conductive condition and remain conductive when the output reference curve from the reference pulse generator 94 applied to the input terminal 149 is closer to zero volts than to —3 volts and said transistors are switched to their nonconductive condition and remain nonconductive when said output reference curve is more negative than —3 volts. The output voltage at the collector electrode of the transistor 154 is shown as curve H of FIG. 12. The collector electrode voltage of the collector electrode of the transistor 155 is shown as curve E of FIG. 12. The output voltage at the collector electrode of the transistor 156 is shown as curve F of FIG. 12. The collector electrode voltage of the collector electrode of the transistor 153 is shown as curve G of FIG. 12. The output voltage at the output terminal 157 is shown as curve I of FIG. 12. The negative reference curve applied to the input terminal 149 is shown as curve B of FIG. 11 and FIG. 12. The positive reference curve applied to the input terminal 151 is shown as curve C of FIG. 11 and FIG. 12. The trigger output voltage applied to the input terminal 152 is shown as curve D of FIG. 12.

The output of the negative sample circuit 141 is similar to and varies similarly to the output of the positive sample circuit 142 as hereinbefore described. When the low pass filter output voltage, applied to the input terminal 148, is negative, the output voltage of the trigger is —12 volts so that —12 volts are applied to the input terminal 152. The first AND gate 143 is then conductive and transfers the output of the negative sample circuit 141 to the output stages of the circuit. The second AND gate 145 is nonconductive at that time, however, and blocks the output of the positive sample circuit 142 from the output stages of the circuit. The output of the negative sample circuit 141 is transferred from the first AND gate 143 to the output terminal 157 via the OR gate 146 and the second inverter amplifier 147.

Figure 13:
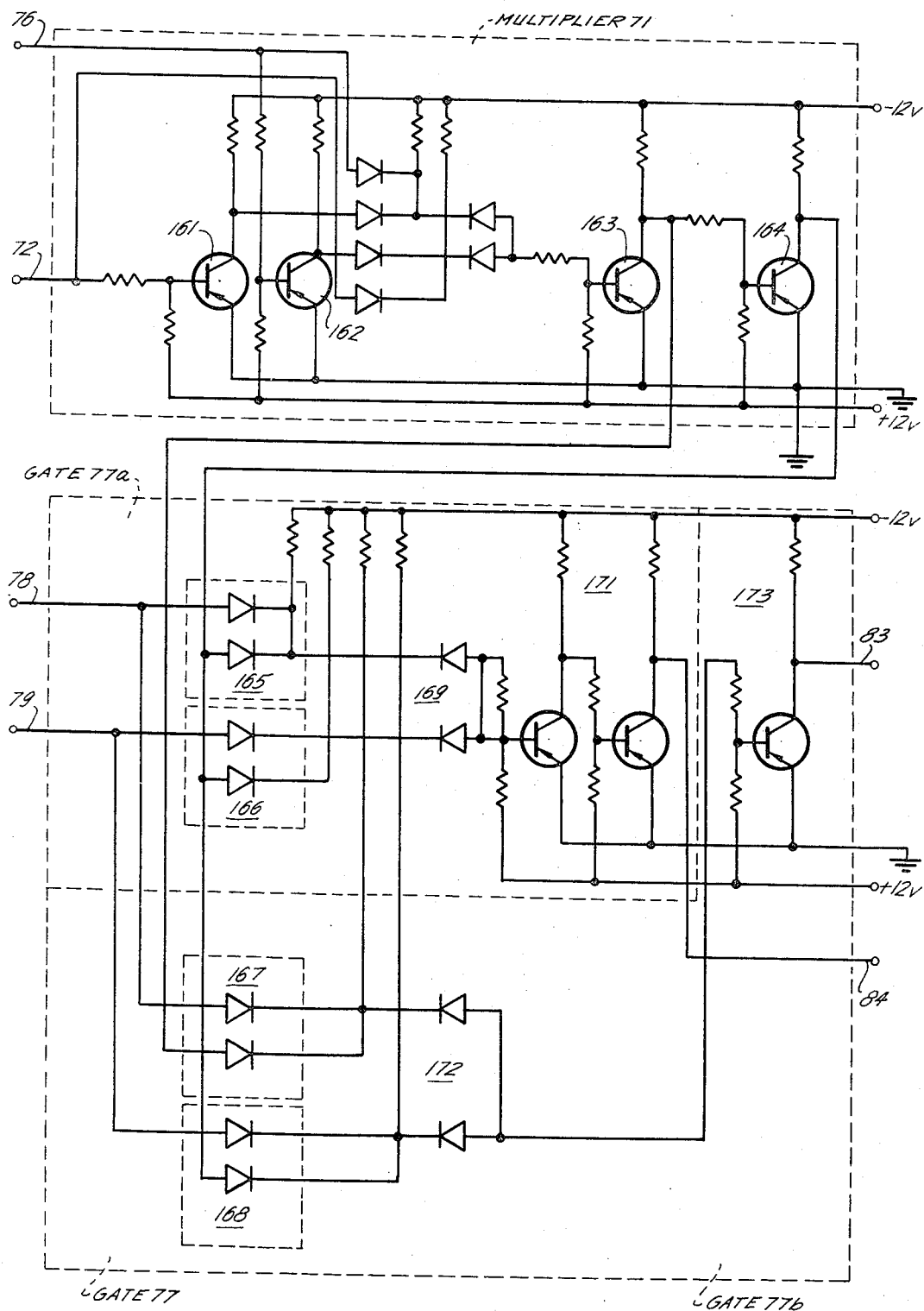
FIG. 13 is a circuit diagram of an embodiment of the multiplier 71 and gate 77 of FIG. 4.

FIG. 13 illustrates a multiplier 71 and a gate 77 which may be utilized in the phase control circuit of FIG. 4. The gate 77 is actually two gates 77a and 77b, as is evident from its described operation relating to FIG. 4. The input leads 72 and 76 are connected to the multiplier 71 as shown in FIG. 4, and the input leads 78 and 79 and the output leads 83 and 84 are connected to the gate 77 as shown in FIG. 4. The operation of the circuit of FIG. 13 is illustrated by Table VI, which indicates for each of the four phases of input signal, the voltage at the input leads 72 and 76, the collector electrode voltage of each of the transistors 161, 162, 163 and 164 of the multiplier 71, the conductive condition of each of the AND gates 165, 166, 167 and 168, and the input signal to the gate 77 which appears at each output of said gate.

output, similar to the input signals in the input leads 78 and 79, is provided at the output terminal 84. These are shown as curve B of FIGS. 15 and 16 and as curve A of FIGS. 15 and 16.

Figure 14:
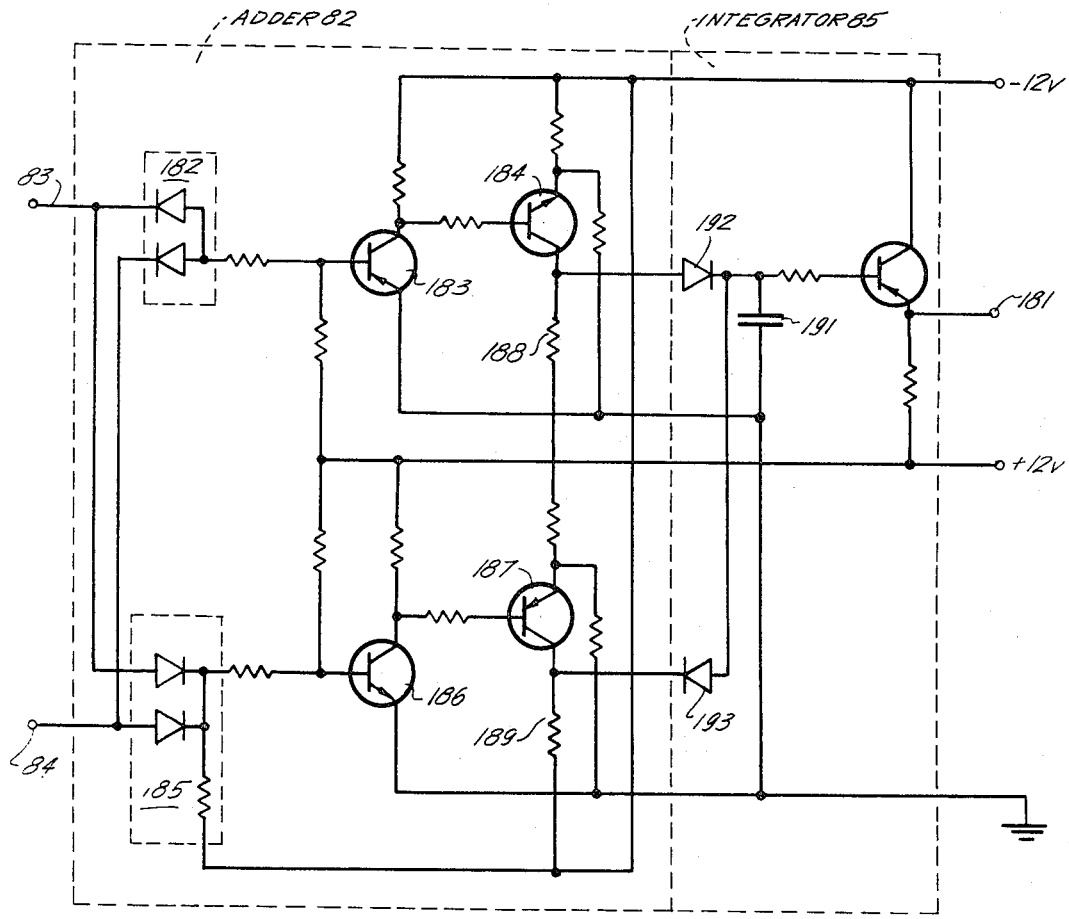
FIG. 14 is a circuit diagram of an embodiment of the adder 82 and integrator 85 of FIG. 4.

FIG. 14 shows an adder 82 and an integrator 85 which may be utilized in the phase control circuit of FIG. 4. The input leads 83 and 84 are connected to the adder 82 as shown in FIG. 4 and output terminal 181 is connected to the reactance control 87 of FIG. 4. FIG. 15 illustrates the operation of the adder and integrator of FIG. 14 when, as shown in curves A and B thereof, the input pulse in the lead 83 has a duration longer than the input pulse in the input lead 84. FIG. 16 illustrates the operation of the adder and integrator of FIG. 14 when, as shown in curves A and B thereof, the input pulse in the lead 83 has a duration shorter than the input pulse in the input lead 84.

The input lead 83 is coupled to the output terminal 181 via a negative OR gate 182, a transistor 183, a transistor

TABLE VI

| | Input signal (voltages in volts) | | | |
|---|---|---|---|---|
| | MIM2 | MIS2 | SIS2 | SIM2 |
| Lead 72 | 0 | 0 | −12 | −12 |
| Lead 76 | 0 | −12 | −12 | 0 |
| Transistor 161 Collector | −12 | −12 | 0 | 0 |
| Transistor 162 Collector | −12 | 0 | 0 | −12 |
| Transistor 163 Collector | −12 | 0 | −12 | 0 |
| Transistor 164 Collector | 0 | −12 | 0 | −12 |
| Conductive condition: | | | | |
| Gate 165 | NON-COND. | COND. | NON-COND. | COND. |
| Gate 166 | COND. | NON-COND. | COND. | NON-COND. |
| Gate 167 | COND. | NON-COND. | COND. | NON-COND. |
| Gate 168 | NON-COND. | COND. | NON-COND. | COND. |
| Output lead related to input lead: | | | | |
| Output lead 83 | 78 | 79 | 78 | 79 |
| Output lead 84 | 79 | 78 | 79 | 78 |

The signals in the input leads 72 and 76 of the multiplier 71, which are the signals in the first and second channels 68 and 74, respectively (FIG. 4), are zero volts for a Mark signal and −12 volts for a Space signal. The collector electrode of the transistor 163 acquires a voltage of −12 volts when the input signals to the input leads 72 and 76 are both Mark or both Space and acquires a voltage of zero volts when said input signals are a Mark and a Space. The collector electrode of the transistor 164 acquires a voltage of zero volts when the input signals to the input leads 72 and 76 are both Mark or both Space and acquires a voltage of −12 volts when said input signals are a Mark and a Space. The collector electrode of the transistor 163 is connected to the AND gates 166 and 167 of the gate 77 and the collector electrode of the transistor 164 is connected to the AND gates 165 and 168 of said gate.

The AND gates 165, 166, 167 and 168 are controlled in their conductive condition by the signals in the input leads 72 and 76. The AND gates 165 and 166 are connected to the output lead 84 via a first OR gate 169 and a first inverter amplifier 171. The AND gates 167 and 168 are connected to the output lead 83 via a second OR gate 172 and a second inverter amplifier 173. When the input signals to the input leads 72 and 76 are both Mark or both Space signals, the AND gates 166 and 167 are switched to their conductive condition and transfer the input signal in the input lead 78 to the output lead 83. The input signal in the input lead 79 is then provided at the output lead 84. When one of the input signals to the input leads 72 and 76 is a Mark signal and the other is a Space signal, the AND gates 165 and 168 are switched to their conductive condition and transfer the input signal in the input lead 79 to the output lead 83. The input signal in the input lead 78 is then provided at the output lead 84.

The signals applied to the gate 77 via the input leads 78 and 79 are the output signals of the first and second converters 61 and 65, respectively, as shown in curve H of FIG. 11 and curve I of FIG. 12. A positive pulse output is provided at the output terminal 83 and a negative pulse 184 and the integrator 85. The input lead 84 is coupled to the output terminal 181 via a negative AND gate 185, a transistor 186, a transistor 187 and the integrator 85. The transistors 183 and 184 amplify the signal transferred by the OR gate 182 and convert the signal voltage to −6 volts when said OR gate provides zero volts and convert the signal voltage to +12 volts when said OR gate provides an output voltage. The transistors 186 and 187 amplify the signal transferred by the AND gate 185 and convert the signal voltage to +6 volts when said AND gate provides zero volts and convert the signal voltage to −12 volts when said AND gate provides an output voltage. The transistor 184 has a collector resistor 188 and the transistor 187 has a collector resistor 189. The collector resistors 188 and 189 have the same resistance value. When either of the transistors 184 and 187 is nonconductive, a capacitor 191 of the integrator 85 is charged to +12 volts or −12 volts via the resistor 188 and a diode 192 or the resistor 189 and a diode 193.

When the duration of the input pulse in the input lead 83, as shown in FIG. 15, curve A, is longer than the duration of the input pulse in the input lead 84, as shown in FIG. 15, curve B, the OR gate 182 provides no output or an output of zero volts, as shown in curve C of FIG. 15, but the AND gate 185 provides an output which comprises a pulse for each difference in duration between the input pulses in the input leads 83 and 84. Thus, as shown in curve D of FIG. 15, the output of the AND gate 185 comprises a first pulse having a duration corresponding to the difference in duration between the input pulses in the input leads 83 and 84 at their leading edges, followed by a second pulse having a duration corresponding to the difference in duration between the input pulses in the input leads 83 and 84 at their trailing edges. Curve E of FIG. 15 shows the collector voltage at the collector electrode of the transistor 184, which remains at −6 volts. Curve F of FIG. 15 shows the collector voltage at the collector electrode of the transistor 187, which is a series of negative pulses from a magnitude of +6 volts to a magnitude of −12 volts, corresponding in duration and in pulse separation to the output of the AND gate 185. The output voltage at the collector electrode of the transistor 187 charges the capacitor 191 of the integrator 85 through the collector resistor 189 and the diode 193 and appears at the output terminal as a negative voltage proportional to the differences in duration of the input pulses in the input leads 83 and 84, as shown in FIG. 15, curve G.

When the duration of the input pulse in the input lead 83, as shown in FIG. 16, curve A, is shorter than the duration of the input pulse in the input lead 84, as shown in FIG. 16, curve B, the OR gate 182 provides an output which comprises a pulse for each difference in duration between the input pulses in the input leads 83 and 84. Thus, as shown in curve C of FIG. 16, the output of the OR gate 182 comprises a first pulse having a duration corresponding to the difference in duration between the input pulses in the input leads 83 and 84 at their leading edges, followed by a second pulse having a duration corresponding to the difference in duration between the input pulses in the input leads 83 and 84 at their trailing edges. The AND gate 185, however, provides no output or an output of zero volts, as shown in curve D of FIG. 16. Curve E of FIG. 16 shows the collector voltage at the collector electrode of the transistor 184, which is a series of positive pulses from a magnitude of −6 volts to a magnitude of +12 volts, corresponding in duration and in pulse separation to the output of the OR gate 182. Curve F of FIG. 16 shows the collector voltage at the collector electrode of the transistor 187, which remains at +6 volts. The output voltage at the collector electrode of the transistor 184 charges the capacitor 191 of the integrator 85 through the collector resistor 188 and the diode 192 and appears at the output terminal as a positive voltage proportional to the differences in duration of the input pulses in the input leads 83 and 84, as shown in FIG. 16, curve G.

The conversion gain of the circuit of FIG. 14 may be varied by variation of the capacitance value of the capacitor 191. Furthermore, if the circuit of FIG. 14 is utilized in the phase control circuit of the present invention (FIG. 4), the circuit of FIG. 14 functions as an auxiliary control circuit. If such auxiliary control operation is not desired, the circuit of FIG. 14 may be made to function as a principal control circuit by the connection of a resistor in parallel with the capacitor 191.

In FIG. 4, the components may comprise any suitable circuitry for accomplishing the desired results and may comprise transistor or electron tube circuitry. Although the input signal has been described as constituting a four-phase modulated wave, it is not so limited and may readily comprise a polyphase modulated wave.

While the invention has been described by means of specific examples and in a specific embodiment, I do not wish to be limited thereto, for obvious modifications will occur to those skilled in the art without departing from the spirit and scope of the invention.

I claim:

1. A phase control circuit for controlling the phase of a carrier wave relative to a pair of input signals, said phase control circuit comprising:

input means for said input signals;
output means for providing from said input signals output signals;
controllable carrier wave generating means having an input and an output coupled to said input means for providing a carrier wave for said input signals; and
control means having an input coupled between said input means and said output means and an output coupled to the input of said carrier wave generating means for controlling the frequency and phase of said carrier wave generating means, said control means comprising converting means for providing a pair of pulses having durations dependent upon the magnitudes of voltages derived from said input signals and adder means coupled between said converting means and the input of said carrier wave generating means for providing a control voltage dependent upon the difference in duration of the pair of pulses provided by said converting means to control the frequency and phase of said carrier wave generating means.

2. A phase control circuit as claimed in claim 1, wherein said control means further comprises gate means connected between said converting means and said adder means for controlling the supply of the pair of pulses provided by said converting means to said adder means and multiplier means connected between said output means and said gate means for controlling the operation of said gate means in accordance with the polarities of said output signals.

3. A phase control circuit as claimed in claim 2, wherein said converting means comprises a pair of outputs providing said pair of pulses and said gate means comprises a pair of signal inputs connected to the pair of outputs of said converting means, a control input connected to said multiplier means and a pair of outputs connected to said adder means.

4. A phase control circuit as claimed in claim 1, wherein said control means further comprises reference pulse generating means connected to said converting means for providing a reference pulse.

5. A phase control circuit as claimed in claim 4, wherein said converting means comprises a plurality of converters each connected to said reference pulse generating means.

6. A phase control circuit as claimed in claim 1, wherein the voltages derived from said input signals are provided by phase detectors connected to said input means.

7. A phase control circuit as claimed in claim 6, wherein the voltages provided by said phase detectors are coupled to said converting means via low pass filters.

8. A phase control circuit as claimed in claim 4, wherein said control means further comprises input level detecting means connected between said input means and said reference pulse generating means for varying the slope of said reference pulse.

9. A phase control circuit as claimed in claim 4, wherein said reference pulse has a waveshape with a slope a determined derivative of which is a constant.

10. A phase control circuit as claimed in claim 3, wherein said carrier wave generating means comprises oscillator means and oscillation frequency control means connected to said oscillator means, wherein said converting means comprises a plurality of converters, and wherein said control means further comprises reference pulse generating means connected to said converting means for providing a reference pulse and the voltages derived from said input signals are provided by phase detectors connected to said input means.

References Cited

UNITED STATES PATENTS

| | | | |
|---|---|---|---|
| 2,824,287 | 2/1958 | Green et al. | 332—1 |
| 2,856,529 | 10/1958 | Mielke | 331—36 X |

ROY LAKE, *Primary Examiner.*

L. J. DAHL, *Assistant Examiner.*